(12) United States Patent
Liang et al.

(10) Patent No.: US 8,514,584 B2
(45) Date of Patent: Aug. 20, 2013

(54) SERIAL ADVANCED TECHNOLOGY ATTACHMENT DIMM DEVICE

(75) Inventors: An-Gang Liang, Shenzhen (CN); Hung-Yi Wu, New Taipei (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 137 days.

(21) Appl. No.: 13/198,866

(22) Filed: Aug. 5, 2011

(65) Prior Publication Data
US 2013/0003285 A1    Jan. 3, 2013

(30) Foreign Application Priority Data
Jun. 30, 2011    (CN) .......................... 2001 1 0181604

(51) Int. Cl.
*H05K 1/14* (2006.01)
(52) U.S. Cl.
USPC ........... 361/785; 361/784; 361/679; 361/728; 701/301

(58) Field of Classification Search
USPC ................... 361/785, 784, 679, 728; 439/43, 439/45; 701/301
See application file for complete search history.

(56) References Cited

U.S. PATENT DOCUMENTS

| 5,793,617 | A  | * | 8/1998 | Dent ............................. 361/785 |
| 2008/0198545 | A1 | * | 8/2008 | Ni et al. ........................ 361/684 |
| 2012/0212988 | A1 | * | 8/2012 | Sugita et al. .................... 365/51 |

* cited by examiner

*Primary Examiner* — Timothy Thompson
*Assistant Examiner* — Andargie M Aychillhum
(74) *Attorney, Agent, or Firm* — Altis Law Group, Inc.

(57) ABSTRACT

A serial advanced technology attachment (SATA) DIMM device includes a board body. A control chip is arranged on the board body. First and second extending boards extend from an end of the board body and a space is defined between the first and the second extending boards. A first edge connector is set on the first extending board and a second edge connector is set on the bottom edges of the second extending board and the board body. The first edge connector includes a number of signal pins connected to the control chip, and a number of ground pins.

7 Claims, 2 Drawing Sheets

SERIAL ADVANCED TECHNOLOGY ATTACHMENT DIMM DEVICE

CROSS-REFERENCE OF RELATED ART

Relevant subject matter is disclosed in a co-pending U.S. patent application with application Ser. No. 13/172,603, filed on Jun. 29, 2011, with the same title "SERIAL ADVANCED TECHNOLOGY ATTACHMENT DIMM", which are assigned to the same assignee as this patent application.

BACKGROUND

1. Technical Field

The present disclosure relates to a serial advanced technology attachment (SATA) DIMM.

2. Description of Related Art

Solid state drives (SSD) store data on chips instead of on the traditional magnetic or optical discs. One type of SSD has the form factor of a dual-in-line memory module (DIMM) module and it is called a serial advanced technology attachment (SATA) DIMM device. As such, the SATADIMM can be inserted into a memory slot of a motherboard, to receive voltages from the motherboard through the memory slot. However, hard disk drive (HDD) signals need to be transmitted between the SATADIMM and the motherboard through a SATA connector arranged on the SATADIMM and connected to a SATA connector of the motherboard. The SATA connector as it is arranged on the SATADIMM may occupy a lot of space, therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by limitation. References to "an" or "one" embodiment in this disclosure are not necessarily to the same embodiment, and such references mean at least one.

Figure 1:
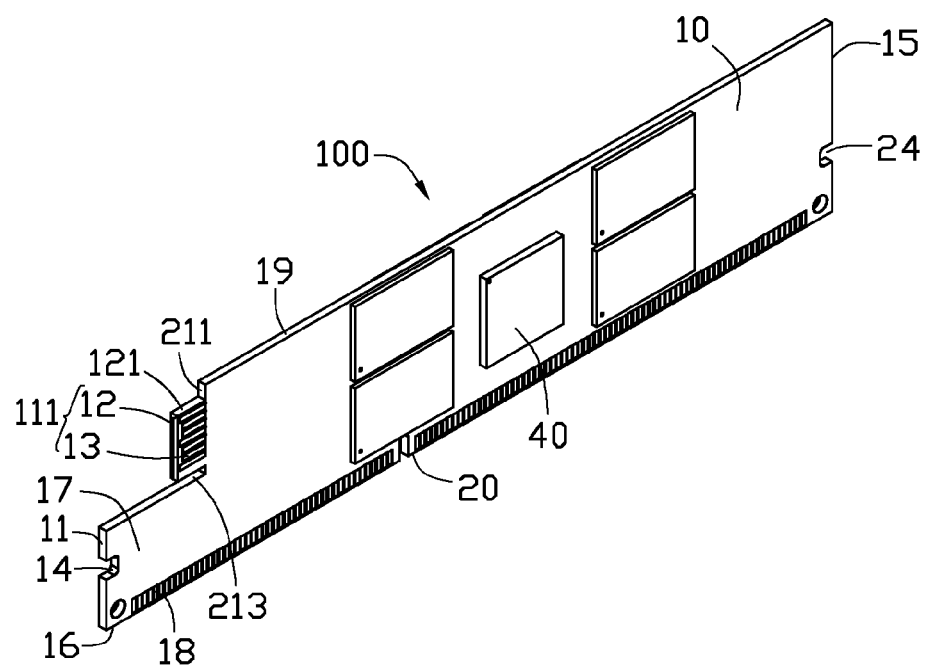
FIG. 1 is a schematic diagram of a serial advanced technology attachment (SATA) DIMM device in accordance with an exemplary embodiment of the present disclosure.
Figure 2:
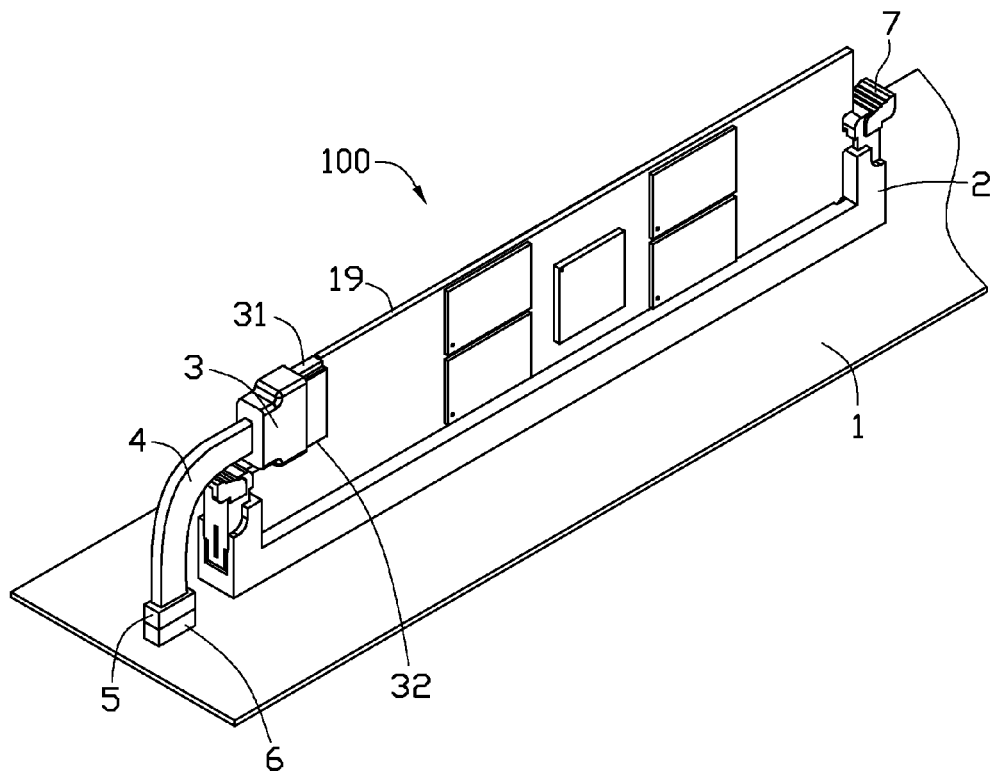
FIG. 2 is a schematic diagram of the SATADIMM device of FIG. 1 connected to a motherboard.

Referring to FIGS. 1 and 2, a serial advanced technology attachment (SATA) DIMM device 100 in accordance with an exemplary embodiment includes a board body 10. The board body 10 is substantially rectangular. A control chip 40 is arranged on the board body 10. Extending boards 12 and 17 extend from a first end 211 of the board body 10. A bottom side 16 of the extending board 17 is coplanar with a bottom side 20 of the board body 10. An edge connector 18 is set on the bottom edges of the extending board 17 and the board body 10. The edge connector 18 may be inserted into a memory slot 2 of a motherboard 1. A groove 14 is defined in a side 11 of the extending board 17, and is matched by a groove 24 defined in a second end 15 of the board body 10. An edge connector 13 is arranged on the extending board 12. The edge connector 13 and the extending board 12 compose a storage device connector 111. A void or space (space 213) is defined between the extending boards 12 and 17.

The top surface 121 of the extending board 12 is lower than the top side 19 of the board body 10. When the storage device connector 111 is connected to a storage device interface 3, the top surface 31 of the storage device interface 3 is not higher than the top side 19 of the board body 10. Thus, there will be a total avoidance or reduction of any physical interference between the SATADIMM device 100 and a chassis (not shown) when the SATADIMM device 100 is mounted on a motherboard 1 accommodated in the chassis. The space 213 allows clearance for the bottom surface 32 of the storage device interface 3 when connected.

The edge connector 13 includes a plurality of signal pins (not labeled) and a plurality of ground pins (not labeled). The signal pins include a pair of signal input pins and a pair of signal output pins. The ground pins include three ground pins. The signal input pins and the signal output pins are connected to the control chip 40 on the board body 10. The ground pins are connected to a ground layer (not shown) of the board body 10.

In one embodiment, the storage device connector 111 accords with the serial advanced technology attachment (SATA) standard. The storage device interface 3 is a SATA connector. In other embodiments, the storage device connector 111 can be arranged or disposed on another side or end of the board body 10, such as on the top side 19 or the second end 15, according to need.

In use, the edge connector 18 of the SATADIMM device 100 is inserted into the memory slot 2 of the motherboard 1. The grooves 14 engage with fixing elements 7 of the memory slot 2, to fix the SATADIMM device 100 to the memory slot 2. The storage device connector 111 is connected to the storage device interface 3. The top surface 31 of the storage device interface 3 is not higher than the top side 19 of the board body 10, to avoid physical interference. A cable 4 connects the storage device interface 3 to the motherboard through storage device interfaces 5 and 6.

When the motherboard 1 is receiving power, the motherboard 1 outputs a voltage to the SATADIMM device 100 through the edge connector 18. At the same time, the motherboard 1 outputs a hard disk drive (HDD) signal to the control chip 40 of the SATADIMM device 100 through the storage device interface 6 to communicate with the SATADIMM 100.

The SATADIMM device 100 can communicate fully with the motherboard 1 through the storage device connector 111, thus obviating the need for a general SATA connector taking up valuable space on the SATADIMM device 100.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A serial advanced technology attachment (SATA) dual-in-line memory module (DIMM) device comprising:
    a board body;
    a control chip arranged on the board body;
    a first extending board extending from a first end of the board body, a first edge connector set on the first extending board, to be connected to a storage device interface of a motherboard, wherein the first edge connector comprising a plurality of signal pins connected to the control chip, and a plurality of ground pins; and a second extending board extending from the first end of the board body, a void or space defined between the first and the second extending boards, to receive the storage device interface of the motherboard, a bottom side of the second extending board being coplanar with a bottom side of the board body, a second edge connector set on bottom edges of the second extending board and the board body, to be inserted into a memory slot of the motherboard;

wherein when the motherboard is powered on, the motherboard outputs a voltage to the SATADIMM device through the memory slot of the motherboard and the second edge connector, and the motherboard also outputs a hard disk drive signal to the control chip of the SATADIMM device through the storage device interface of the motherboard and the first edge connector, to communicate with the SATADIMM device.

2. The SATADIMM device of claim 1, wherein the first extending board and the first edge connector compose a storage device connector, the storage device connector conforms with a serial advanced technology attachment (SATA) standard.

3. The SATADIMM device of claim 1, wherein the plurality of signal pins comprises a pair of signal input pins and a pair of signal output pins.

4. The SATADIMM device of claim 1, wherein a top surface of the first extending board is lower than a top side of the board body opposite to the bottom side of the board body, when a storage device interface is connected to the first edge connector, a top surface of the storage device interface is not higher than the top side of the board body.

5. A serial advanced technology attachment (SATA) dual-in-line memory module (DIMM) device comprising:

a board body;

a control chip arranged on the board body;

a first extending board extending from a first end of the board body, a first edge connector set on the first extending board, wherein the first edge connector comprising a plurality of signal pins connected to the control chip, and a plurality of ground pins; and a second extending board extending from the first end of the board body, a void or space defined between the first and the second extending boards, a bottom side of the second extending board being coplanar with a bottom side of the board body, a second edge connector set on bottom edges of the second extending board and the board body;

wherein a top surface of the first extending board is lower than a top side of the board body opposite to the bottom side of the board body, when a storage device interface is connected to the first edge connector, a top surface of the storage device interface is not higher than the top side of the board body.

6. The SATADIMM device of claim 5, wherein the first extending board and the first edge connector compose a storage device connector, the storage device connector conforms with a serial advanced technology attachment (SATA) standard.

7. The SATADIMM device of claim 5, wherein the plurality of signal pins comprises a pair of signal input pins and a pair of signal output pins.

* * * * *